United States Patent
Nath et al.

(10) Patent No.: US 11,115,185 B2
(45) Date of Patent: *Sep. 7, 2021

(54) HIGHLY SECURE WAIC BASEBAND SIGNAL TRANSMISSION WITH BYTE DISPLACEMENT APPROACH

(71) Applicant: ROSEMOUNT AEROSPACE INC., Burnsville, MN (US)

(72) Inventors: Pranay Kanti Nath, Karnataka (IN); Pullaiah Dussa, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/433,460

(22) Filed: Jun. 6, 2019

(65) Prior Publication Data
US 2020/0304286 A1 Sep. 24, 2020

(30) Foreign Application Priority Data
Mar. 22, 2019 (IN) .............................. 201911011203

(51) Int. Cl.
*H04L 29/06* (2006.01)
*H04L 9/06* (2006.01)
(Continued)

(52) U.S. Cl.
CPC .......... *H04L 9/0618* (2013.01); *H04L 9/0861* (2013.01); *H04L 9/34* (2013.01); *H04W 12/047* (2021.01)

(58) Field of Classification Search
CPC ....... H04L 9/0618; H04L 9/0861; H04L 9/34; H04L 2209/12; H04L 9/0869;
(Continued)

(56) References Cited

U.S. PATENT DOCUMENTS 3,746,799 A * 7/1973 Gentges ................ H04L 9/0656
380/42
4,887,296 A * 12/1989 Horne ................ H04B 7/18523
380/239
(Continued)

FOREIGN PATENT DOCUMENTS

CA 2036489 C * 4/2001 ........... H04L 9/0668
GB 2319705 A * 5/1998 ........... H04L 9/0625
(Continued)

OTHER PUBLICATIONS

Akram et al., "An Efficient, Secure and Trusted Channel Protocol for Avionics Wireless Networks," Cornell University Library, Aug. 14, 2016, 10 pages.

(Continued)

Primary Examiner — John B King
(74) Attorney, Agent, or Firm — Cantor Colburn LLP

(57) ABSTRACT

A transceiver baseband hardware including an encryption-decryption block configured to encrypt and jumble intended transmission data or unjumble and decrypt received encrypted data, the encryption-decryption based on key coefficients generated based on a random key address, the encryption-decryption implemented via a cross logical operation of the encryption-decryption block. The cross logical operation includes when lower significant bytes of the key coefficients operating on most significant bytes of the intended transmission data and the encrypted data. The jumble and unjumble are implemented by a byte displacement/placement block based at least in part on the random key address.

19 Claims, 5 Drawing Sheets

(51) Int. Cl.
*H04L 9/08* (2006.01)
*H04L 9/34* (2006.01)
*H04W 12/047* (2021.01)

(58) Field of Classification Search
CPC ...... H04L 9/0625; H04L 9/14; H04W 12/047; H04W 12/009; H04W 4/40; H04W 12/03; G06F 21/602; G06F 21/606
See application file for complete search history.

(56) References Cited

U.S. PATENT DOCUMENTS

| | | | | |
|---|---|---|---|---|
| 5,826,171 | A | * | 10/1998 | Franke ................ H04K 3/45 455/26.1 |
| 5,960,086 | A | * | 9/1999 | Atalla ............... H04L 9/0891 380/44 |
| 8,811,616 | B2 | | 8/2014 | Cabos |
| 9,178,567 | B2 | | 11/2015 | Klein et al. |
| 2008/0285747 | A1 | | 11/2008 | Kim et al. |
| 2017/0187539 | A1 | | 6/2017 | Thompson et al. |
| 2020/0252378 | A1 | * | 8/2020 | Nath ................ H04L 9/0662 |
| 2020/0336900 | A1 | * | 10/2020 | Mueck ................ H04W 4/50 |

FOREIGN PATENT DOCUMENTS

| | | | | |
|---|---|---|---|---|
| KR | 20090018476 A | * | 2/2009 | |
| WO | WO-02102103 A2 | * | 12/2002 | ........ H04W 12/0401 |

OTHER PUBLICATIONS

Menezes et al., "Chapter 7: Block Ciphers ED," Handbook of Applied Cryptography, CRC Press Inc., 1996, pp. 223-282.

Smith et al., "Economy Class Crypto: Exploring Weak Cipher Usage in Avionic Communications via ACARS," International Conference on Financial Cryptography and Data Security, Dec. 23, 2017, pp. 285-301.

Extended European Search Report; dated Apr. 24, 2020; European Application No. 19210202.8; Filed: Nov. 19, 2019; 10 pages.

* cited by examiner

HIGHLY SECURE WAIC BASEBAND SIGNAL TRANSMISSION WITH BYTE DISPLACEMENT APPROACH

CROSS-REFERENCE TO RELATED APPLICATIONS

This application claims the benefit of India Application No. 201911011203 filed Mar. 22, 2019, which is incorporated herein by reference in its entirety.

BACKGROUND

Exemplary embodiments pertain to the art of a protective approach for wireless avionics intra-communication (WAIC) baseband signal transmission. In general, WAIC technology is implemented into aircraft platforms for data communication between avionics subsystems and the cockpit. WAIC operates on the frequency spectrum of 4.2 GHz to 4.4 GHz. To avoid unintended access of data communicated by WAIC technology, communications thereof can be secured by encryption of the data before transmitting between originating points to usage points. Encryption can be implemented by software encryption and/or hardware encryption. Hardware encryption is considered to be safer and very difficult to intercept.

BRIEF DESCRIPTION

In accordance with one or more embodiments, a transceiver baseband hardware including an encryption-decryption block configured to encrypt and jumble intended transmission data or unjumble and decrypt received encrypted data. The encryption-decryption based on key coefficients generated based on a random key address, the encryption-decryption implemented via a cross logical operation of the encryption-decryption block. The cross logical operation includes when lower significant bytes of the key coefficients operating on most significant bytes of the intended transmission data and the encrypted data. The jumble and unjumble are implemented by a byte displacement/placement block based at least in part on the random key address.

In addition to one or more of the features described above, or as an alternative, further embodiments of the transceiver baseband hardware may include that the baseband hardware block comprises an on-chip memory storing the key coefficients.

In addition to one or more of the features described above, or as an alternative, further embodiments of the transceiver baseband hardware may include that the baseband hardware block comprises a random number generator that generates a random key address for selecting one of the key coefficients stored in an on-chip memory.

In addition to one or more of the features described above, or as an alternative, further embodiments of the transceiver baseband hardware may include that the encryption-decryption block comprises encryption-decryption logic the cross logical operation as a hardware implementation.

In addition to one or more of the features described above, or as an alternative, further embodiments of the transceiver baseband hardware may include that the byte displacement/placement block includes byte displacement/placement logic as a hardware implementation.

In addition to one or more of the features described above, or as an alternative, further embodiments of the transceiver baseband hardware may include that the byte displacement/placement block implements a look-up table responsive to the random key address, wherein the look-up table is variable for a selected aircraft.

In addition to one or more of the features described above, or as an alternative, further embodiments of the transceiver baseband hardware may include that at least one of the random key address and key coefficients are variable for a selected aircraft.

In addition to one or more of the features described above, or as an alternative, further embodiments of the transceiver baseband hardware may include that a field programmable gate array (FPGA) or a microcontroller based system comprises the transceiver baseband hardware, wherein the FPGA or the microcontroller based system provides the intended transmission data to the baseband hardware block for encryption.

In addition to one or more of the features described above, or as an alternative, further embodiments of the transceiver baseband hardware may include that the transceiver baseband hardware includes an antenna and an interface that, in combination, transmit and receive the encrypted data to and from external transceivers.

In addition to one or more of the features described above, or as an alternative, further embodiments of the transceiver baseband hardware may include that the interface comprises a radio frequency transceiver that transmits or receives the encrypted data at 4.2-4.4 GHz via the antenna.

Also described herein in another embodiment is an encryption/decryption method implemented by a transceiver baseband hardware. The encryption/decryption method including utilizing a random key address to select a key coefficient stored on an on-chip memory of the transceiver baseband hardware, applying a cross logical operation utilizing the key coefficient to encrypt intended transmission data or decrypt encrypted data via an encryption-decryption block of the transceiver baseband hardware, and employing the random key address to jumble the encrypted transmission data or unjumble received jumbled encrypted data via a byte displacement/placement block of the transceiver baseband hardware. The cross logical operation comprises lower significant bytes of the key coefficients operating on most significant bytes of the intended transmission data or the encrypted data.

In addition to one or more of the features described above, or as an alternative, further embodiments of the encryption/decryption method may include that the on-chip memory pre-stores the key coefficients.

In addition to one or more of the features described above, or as an alternative, further embodiments of the encryption/decryption method may include that the random number generator generates the random key address for selecting the key coefficients and controlling the byte placement/displacement block.

In addition to one or more of the features described above, or as an alternative, further embodiments of the encryption/decryption method may include that the cross logical operation is a hardware implementation of the encryption-decryption block.

In addition to one or more of the features described above, or as an alternative, further embodiments of the encryption/decryption method may include that the jumble the encrypted transmission data or unjumble received jumbled encrypted data operation is a hardware implementation of the byte displacement/placement logic in the transceiver baseband hardware.

In addition to one or more of the features described above, or as an alternative, further embodiments of the encryption/ decryption method may include that a field programmable gate array (FPGA) or a microcontroller based system comprises the transceiver baseband hardware, wherein the FPGA or the microcontroller based system provides the intended transmission data to the baseband hardware function or block for encryption.

In addition to one or more of the features described above, or as an alternative, further embodiments of the encryption/decryption method may include that the transceiver baseband hardware includes interfacing with an antenna that, in combination, transmits and receives the encrypted data to and from external transceivers.

In addition to one or more of the features described above, or as an alternative, further embodiments of the encryption/decryption method may include that transmitting with an interface that comprises a radio frequency transceiver that transmits or receives the encrypted data at 4.2-4.4 GHz via the antenna.

In addition to one or more of the features described above, or as an alternative, further embodiments of the encryption/decryption method may include that implementing a look-up table responsive to the random key address, wherein the look-up table is variable for a selected aircraft.

In addition to one or more of the features described above, or as an alternative, further embodiments of the encryption/decryption method may include that at least one of the random key address and the key coefficients are variable for a selected aircraft.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Turning now to an overview of the aspects of the described embodiments, one or more embodiments provide an encryption and decryption system comprising wireless transceiver baseband hardware that encrypts and/or decrypts data to transmit or receive data securely between wireless systems. Embodiments of the encryption and decryption system disclosed herein can be implemented in a system, method, and/or computer program product (generally referred to as an encryption and decryption system herein).

Embodiments of the encryption and decryption system are necessarily rooted in wireless transceiver baseband hardware system therein to perform proactive operations to overcome problems specifically arising in the realm of WAIC technology. Particular distinction of the encryption and decryption system include, but are not limited to, hardware based wireless sensor data protection for WAIC network systems for aircraft (e.g., encryption and decryption), mixed logical operations (e.g., XOR & XNOR) on different bytes of the same data word for encryption, and mixed logical operations (e.g., XOR & XNOR) on different bytes of the same data word for decryption, cross logical operation (e.g., lower significant byte of key coefficients word operating on most significant byte of actual data), packetizing of key coefficients memory address location along with the encrypted data, extracting the key coefficients memory address from the packetized data in the receiver, and usage of key coefficients stored in the memory locations for encryption and decryption.

Technical effects and benefits of the encryption and decryption system include enabling the programming of key coefficients stored in on-chip memory, providing an indirect way of the access for the digital key, applying logic on a transceiver to make the data difficult to intercept, implementing a hardware based solution for very fast execution, reducing resource consumption, and utilizing baseband logic.

Figure 1:
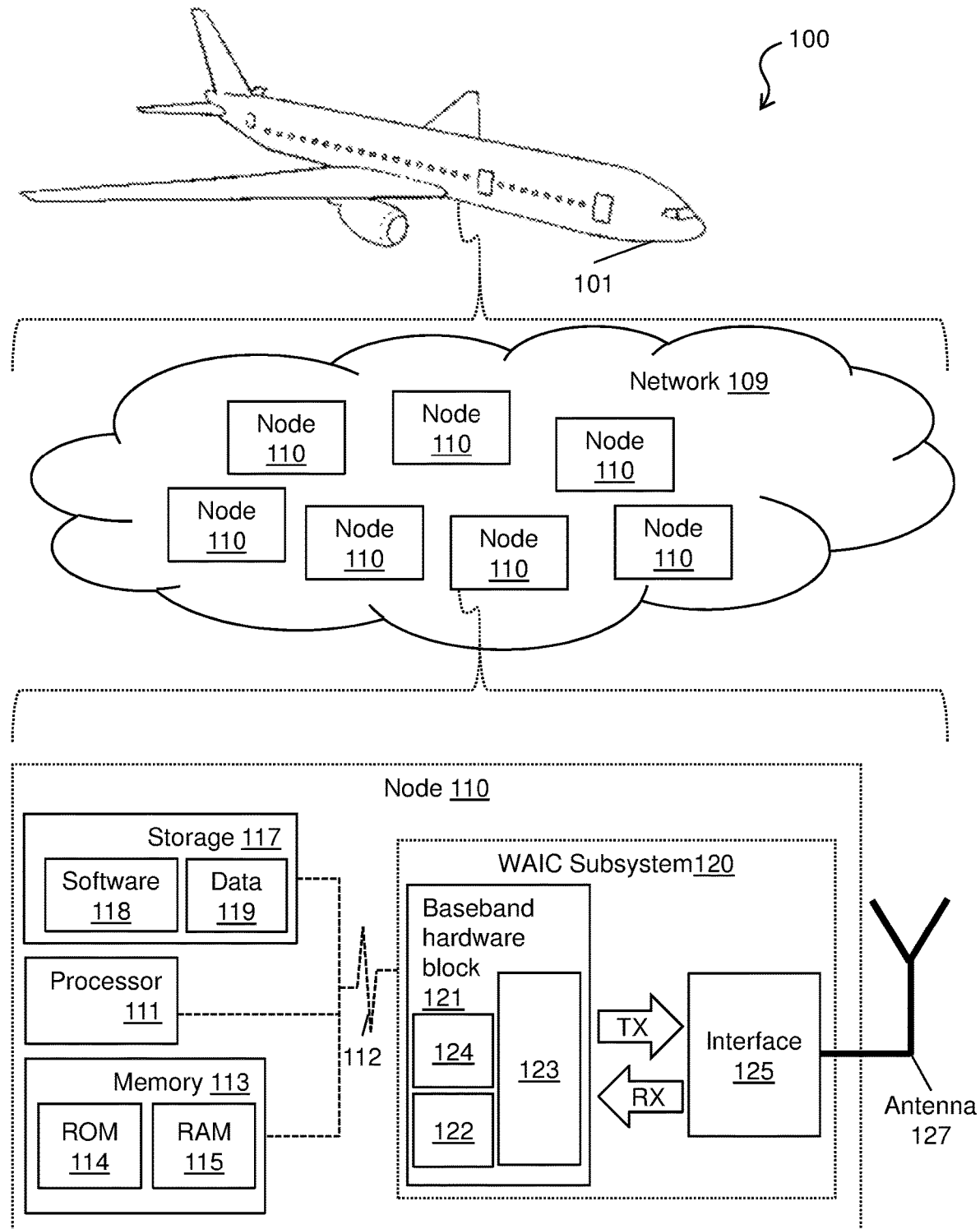
FIG. 1 depicts a system in accordance with one or more embodiments.

Turning now to FIG. 1, an encryption and decryption system 100 for implementing the teachings herein is shown in according to one or more embodiments of the invention. By way of example only, the encryption and decryption system 100 is embodied on an aircraft 101. The encryption and decryption system 100 can be an electronic, computer framework comprising and/or employing any number and combination of computing device and networks utilizing various communication technologies, as described herein. The encryption and decryption system 100 can be easily scalable, extensible, and modular, with the ability to change to different services or reconfigure some features independently of others.

The encryption and decryption system 100 can include a network 109 enabling nodes 110 of the encryption and decryption system 100 to communicate therein, along with other systems, devices, data, and software of the aircraft 101.

Each node 110 can be a computer system unit housing/enclosing computer hardware components, such as a server, a database, a component, and a sub-system. In accordance with one or more embodiments, the node can be or include a field programmable gate array (FPGA) or a microcontroller based system. As shown in FIG. 1, a node 110 can further include a processor 111, which can include one or more central processing units (CPUs). The processor 111, also referred to as a processing circuit, microprocessor, computing unit, is coupled via a system bus 112 to a memory 113 and various other components. The memory 113 includes read only memory (ROM) 114 and random access memory (RAM) 115. The ROM 114 is coupled to the system bus 112 and may include a basic input/output system (BIOS), which controls certain basic functions of the encryption and decryption system 100. The RAM 115 is read-write memory coupled to the system bus 112 for use by the processor 111.

The node 110 of FIG. 1 can include storage 117, which is an example of a tangible storage medium readable executable by the processor 111. The storage 117 stores software 118 and data 119. The software 118 is stored as machine readable instructions for execution on the encryption and decryption system 100 by the processor 111 (to perform process, such as the process flows of FIGS. 2-3). The software 118 can be stored as different versions. The data 119 includes a set of values of qualitative or quantitative variables organized in various data structures to support and be used by operations of the software 118. Example of the data 119 can include information as described herein (e.g., node operational data).

It will be understood that each block as described herein of the illustrations and/or block diagrams, and combinations of blocks may be implemented by hardware, firmware, and/or computer machine readable program instructions stored on a computer readable medium. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

The node 110 of FIG. 1 also includes a WAIC subsystem 120. The WAIC subsystem 120 is an example of a wireless transceiver baseband hardware system described herein. The WAIC subsystem 120 can include a baseband hardware block 121, which includes a random number generator 122, an encryption-decryption block 123, and a ROM 124. The WAIC subsystem 120 can also include an interface 125 and an antenna 127.

The WAIC subsystem 120 can encrypt data received via the system bus 112 with an indirect encryption key and a cross logical encryption operation by utilizing the encryption-decryption block 123. In this regard, the encryption-decryption block 123 produces and provides encrypted data to the interface 125 (as shown by TX arrow of FIG. 1). The interface 125 (which can be a radio frequency transceiver) interconnects and supports communications sent and received through the antenna 127 between the nodes 110, such that the WAIC subsystem 120 can wirelessly transmit and/or receive the encrypted data at 4.2-4.4 GHz. The WAIC subsystem 120 can also decrypt encrypted data received (as shown by RX arrow of FIG. 1) via the antenna 127 and the interface 125 by utilizing the encryption-decryption block 123 and provide the decrypted data via the system bus 112 to the remaining components of the node 110. Schematics and operations of the WAIC subsystem 120 are described with respect to FIGS. 2-5.

Figure 2:
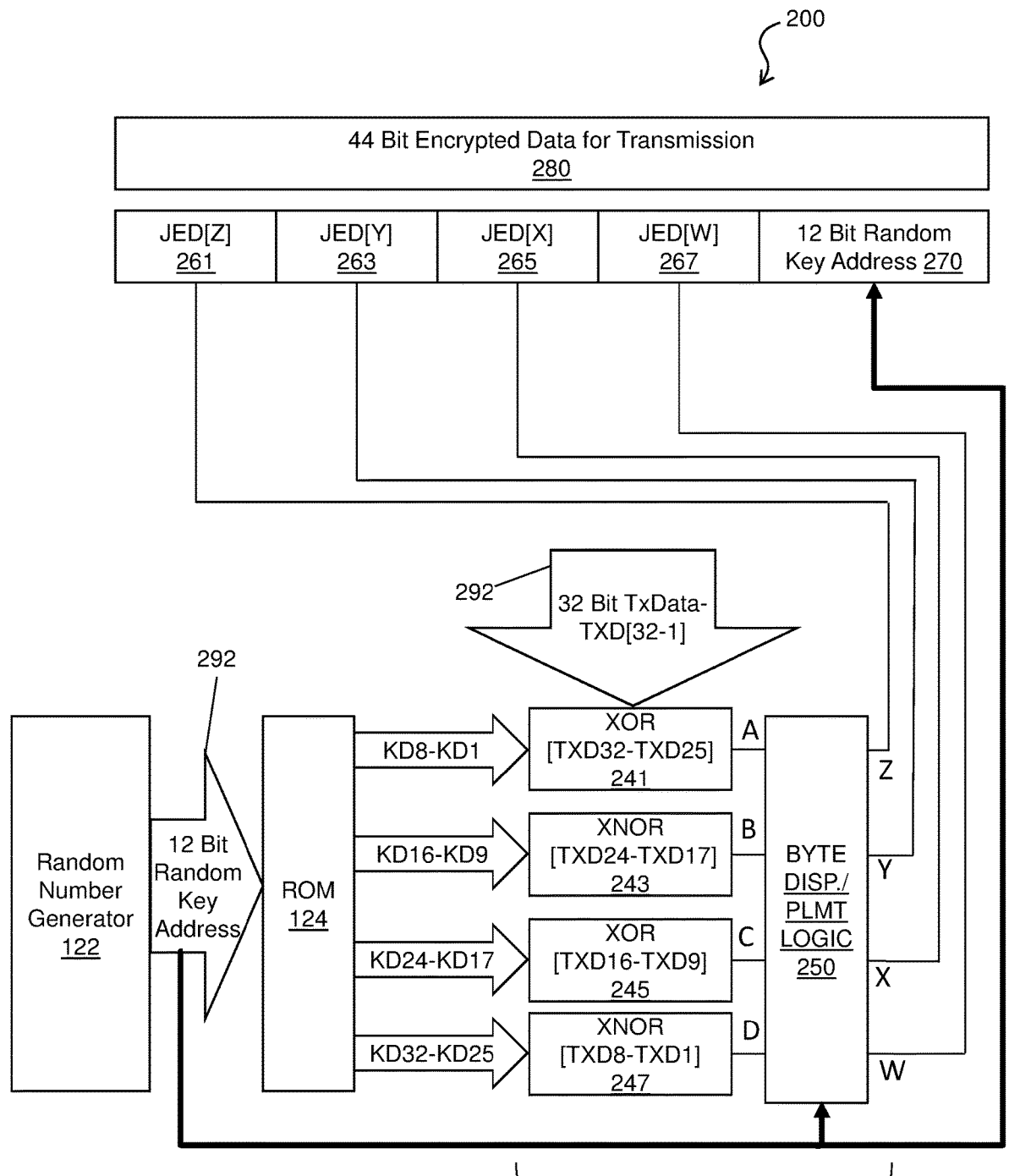
FIG. 2 depicts an encryption block schematic in accordance with one or more embodiments.

FIG. 2 depicts an encryption block schematic 200 in accordance with one or more embodiments. The encryption block schematic 200 is an example of the baseband hardware block 121 of FIG. 1, where actual data (e.g., intended transmission data) is received and provided to the components of the node 110 and encrypted data is received and provided to the interface 125. As shown, the encryption block schematic 200 comprises the random number generator 122 of FIG. 1, the ROM 124, encryption-decryption logic 241, 243, 245, and 247, and byte displacement logic 250. The encryption-decryption logic 241, 243, 245, and 247 and byte placement logic are implemented as logic gate hardware within the encryption block schematic 200. The ROM 124 can be a 32 bit wide on-chip memory that holds key coefficients (KDxx). Note that each ROM 124 of each node 110 has the same key coefficients.

Figure 3:
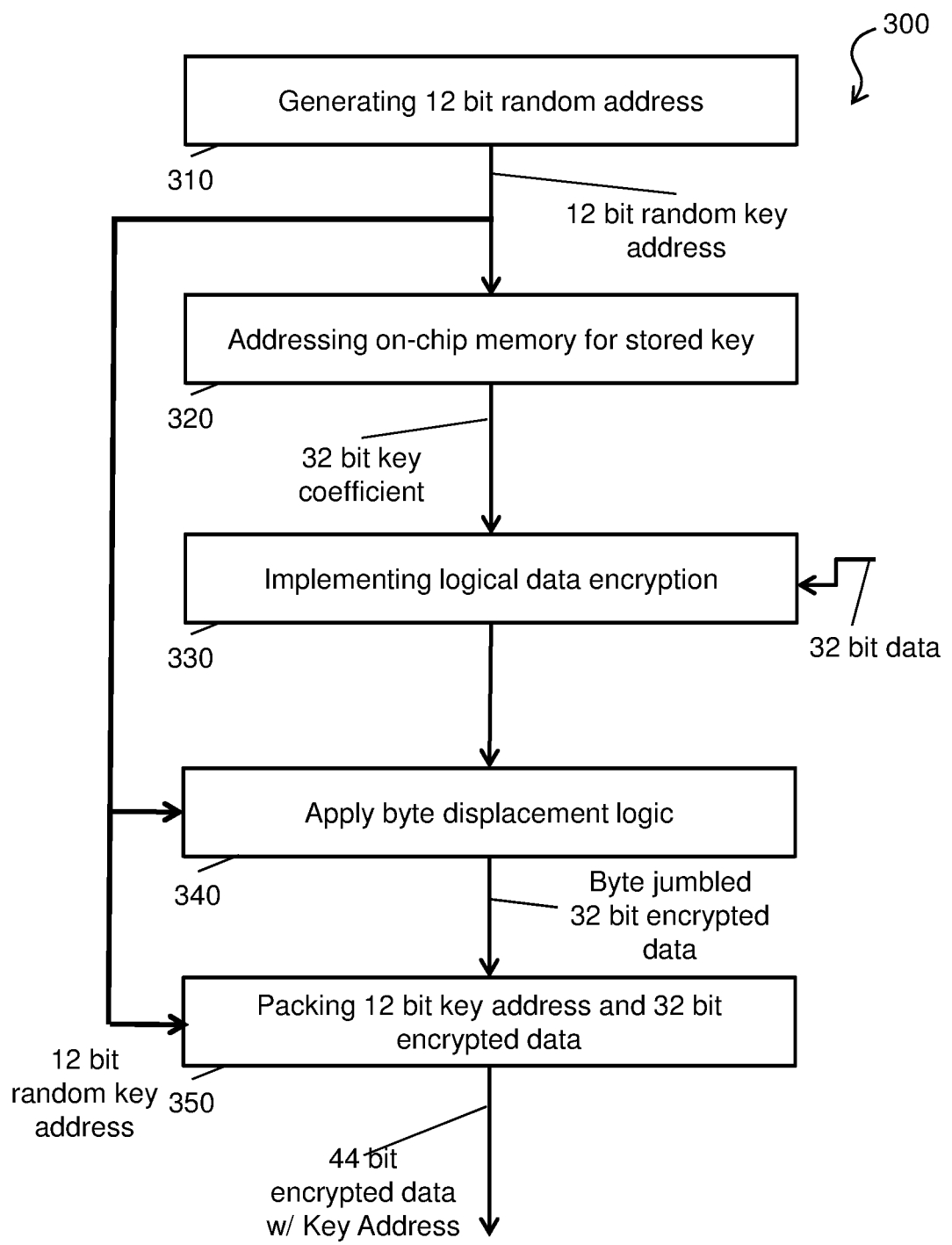
FIG. 3 depicts a process flow in accordance with one or more embodiments.

FIG. 3 depicts a process flow 300 in accordance with one or more embodiments. The process flow 300 is an example of how the encryption block schematic 200 encrypts data for transmission. Note that the encryption of process flow 300 is at the hardware/chip level. The process flow 300 begins at block 310, where the random number generator 122 generates 12 bit random key address. At block 320, the 12 bit random key address (as shown by arrow 291 of FIG. 2) is used to address 4 k memory location of the ROM 124 to select the pre-stored 32 bit key coefficient (KDxx). Key coefficients are stored in the on-chip memory and it is expected the key coefficients are different from each other. For example, in a memory which is 32 bits wide having 4000 locations, all 4000 locations each would include a 32 bit pre stored key coefficient, each of which is different from the other.

Continuing with FIGS. 2 and 3, at block 330, 32 bit data (e.g., the actual data or intended transmission data; also as shown by arrow 292 of FIG. 2) is logically encrypted using key coefficients to make encrypted data (EDxx). Note that, in accordance with one or more embodiments, 32 bit key coefficients are arranged byte wise. For example, as shown in FIG. 2, a cross logical encryption operation is performed. That is, KD8-KD1 low significant byte of the key coefficient stored in the ROM 124 perform an XOR operation (e.g., encryption-decryption logic 241) with most significant byte of the 32 bit data (e.g., TXD32-TXD25) to generate most significant byte of encrypted data (depicted as A). Further, KD16-KD9 is used for TXD24-TXD17 to do a XNOR operation (e.g., encryption-decryption logic 243) and generates the next most significant byte of encrypted data denoted as B; KD24-KD17 is used for TXD16-TXD9 to do a XOR operation (e.g., encryption-decryption logic 245), which generates a third encrypted byte denoted a C; and KD32-KD25 is used for TXD8-TXD1 to do a XNOR operation (e.g., encryption-decryption logic 247), which generates the least significant encrypted byte denoted as D.

At block 340, 12 bit random key address and the 32 bit encrypted data A, B, C, D are then passed to a byte displacement logic function 250 (denoted "BYTE DISPLACEMENT LOGIC"). This byte displacement logic jumbles the byte positions of the four encrypted data bytes A, B, C, and D respectively to formulate jumbled encrypted data bytes depicted as "W", "X", "Y", and "Z" in the final 44 bit data packet. In operation the byte displacement logic 250 is effectively is a Byte cross point switch the scrambles and jumbles the encrypted data bytes A, B, C, and D based on the random key address. In an embodiment for simplicity the byte displacement logic 250 employs and operates with lower 5 bits of the 12 bit random key address. As a result, the mentioned byte displacement logic 250 will change the byte locations randomly in the final data packet. The output of the byte displacement logic is a jumbled encrypted data shown as "W", "X", "Y" and "Z". For example, depending on the last 5 bits of the random key address "Z" can be any one of the encrypted data bytes A, B, C and D. Similarly "Y" can be any one of the remaining A, B, C and D, "X" can be any one of remaining A, B, C and D, and "W" can be any one of the remaining of A, B, C and D. None of the encrypted data bytes A, B, C or D should be repeated, which means if "Z" has been assigned "A" then "W", "X" and "Y" cannot have "A" at that instance. Therefore, with theory of permutation [4P4=4!/(4−4)!=24] it should be noted that the four encrypted data bytes A, B, C and D can be arranged/rearranged in 24 different ways. In an embodiment, the lower 5 bits of random key address are used to generate different placement of A, B, C, and D to yield W, X, Y, and Z. As we have 5 bits of random number, it yields 32 different combinations of placements of byte. However, there are only 24 different combinations for the 4 byte's possible placement. As a result, in Table-1 intentionally some of the byte placements are kept same. Table-1 depicts a truth table of the byte placement and displacement logic 250. Here in this case 32 bit key coefficients are arranged byte wise. A logical cross byte operation between key coefficient and intended transmission data byte generates the intended Encrypted Data Bytes A, B, C and D. It should also be appreciated that in order to implement a more secure communication, the table lookup, address lookup in ROM 124 or even the encryption techniques could be aircraft dependent. For example a unique look up table scheme for each aircraft 101 would ensure that components on one aircraft 101 could not mistakenly communicate with another.

byte placement logic 250, and encryption-decryption logic 241, 243, 245, and 247. Similar but opposite the encryption description, the byte placement logic unjumbles the received jumbled encrypted data 280 (e.g., Z, Y, X, W) based on the key address (the least 5 bits thereof) to form the unscrambled encrypted 4 bytes of data shown as D, C, B, and A. Likewise the encryption-decryption logic 241, 243, 245, and 247 decrypts the 44 bit encrypted data D, C, B, A for transmission to 32 bit decrypted data. The 32 bit decrypted data is a combination of 4 bytes decrypted data (identified as RXD 481, 483, 485, and 487).

TABLE 1

Truth Table of Byte Displacement/Placement Logic

| Encryption | INPUT | | | | | OUTPUT | | | |
|---|---|---|---|---|---|---|---|---|---|
| Decryption | TXD [32:25] | TXD [24:17] | TXD [16:9] | TXD [8:1] | | Z | Y | X | W |
| | | | | | OUTPUT | INPUT | | | |
| 0 | A | B | C | D | BYTE | A | B | C | D |
| 1 | A | B | C | D | PLACEMENT/ | A | B | C | D |
| 2 | A | B | C | D | DISPLACEMENT | A | B | C | D |
| 3 | A | B | C | D | LOGIC | A | B | D | C |
| 4 | A | B | C | D | | A | C | B | D |
| 5 | A | B | C | D | | A | C | D | B |
| 6 | A | B | C | D | | A | D | B | C |
| 7 | A | B | C | D | | A | D | C | B |
| 8 | A | B | C | D | | B | A | C | D |
| 9 | A | B | C | D | | B | A | D | C |
| 10 | A | B | C | D | | B | C | A | D |
| 11 | A | B | C | D | | B | C | D | A |
| 12 | A | B | C | D | | B | D | A | C |
| 13 | A | B | C | D | | B | D | C | A |
| 14 | A | B | C | D | | C | A | B | D |
| 15 | A | B | C | D | | C | A | D | B |
| 16 | A | B | C | D | | C | B | A | D |
| 17 | A | B | C | D | | C | B | D | A |
| 18 | A | B | C | D | | C | D | A | B |
| 19 | A | B | C | D | | C | D | B | A |
| 20 | A | B | C | D | | D | A | B | C |
| 21 | A | B | C | D | | D | A | B | C |
| 22 | A | B | C | D | | D | A | C | B |
| 23 | A | B | C | D | | D | A | C | B |
| 24 | A | B | C | D | | D | B | A | C |
| 25 | A | B | C | D | | D | B | A | C |
| 26 | A | B | C | D | | D | B | C | A |
| 27 | A | B | C | D | | D | B | C | A |
| 28 | A | B | C | D | | D | C | A | B |
| 29 | A | B | C | D | | D | C | A | B |
| 30 | A | B | C | D | | D | C | B | A |
| 31 | A | B | C | D | | D | C | B | A |

Continuing with FIGS. 2 and 3, the process 300 continues at block 350, 12 bit random key address and the 32 bit encrypted data (EDxx) to be packed in 44 bit packet before sending to the RF. As shown in FIG. 2, each byte of byte jumbled encrypted data Z, 261, Y, 263, X, 265, and W, 267 is packed with the 12 bit random key address (270) to produce a 44 bit encrypted data 280 for transmission.

Figure 4:
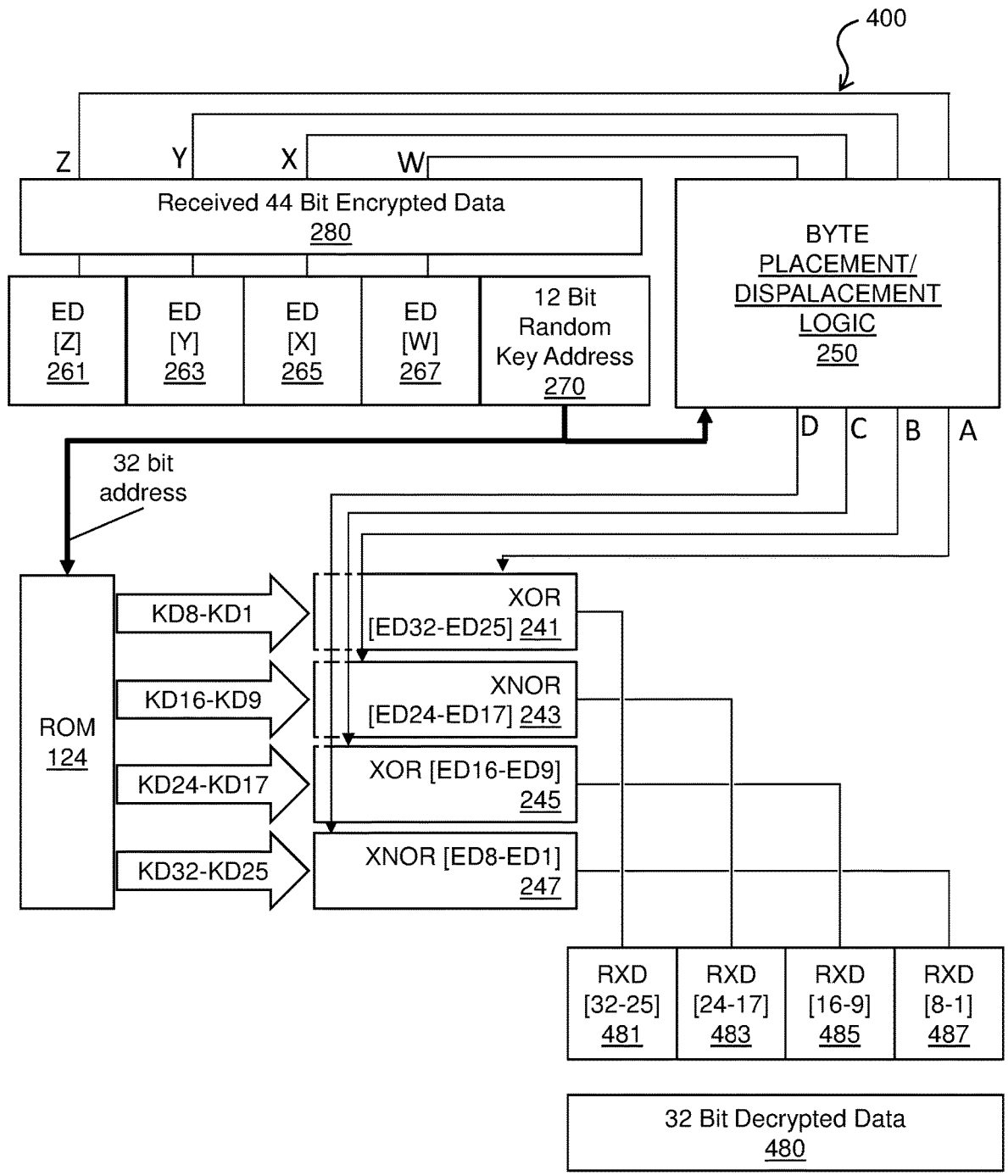
FIG. 4 depicts a decryption block schematic in accordance with one or more embodiments.
Figure 5:
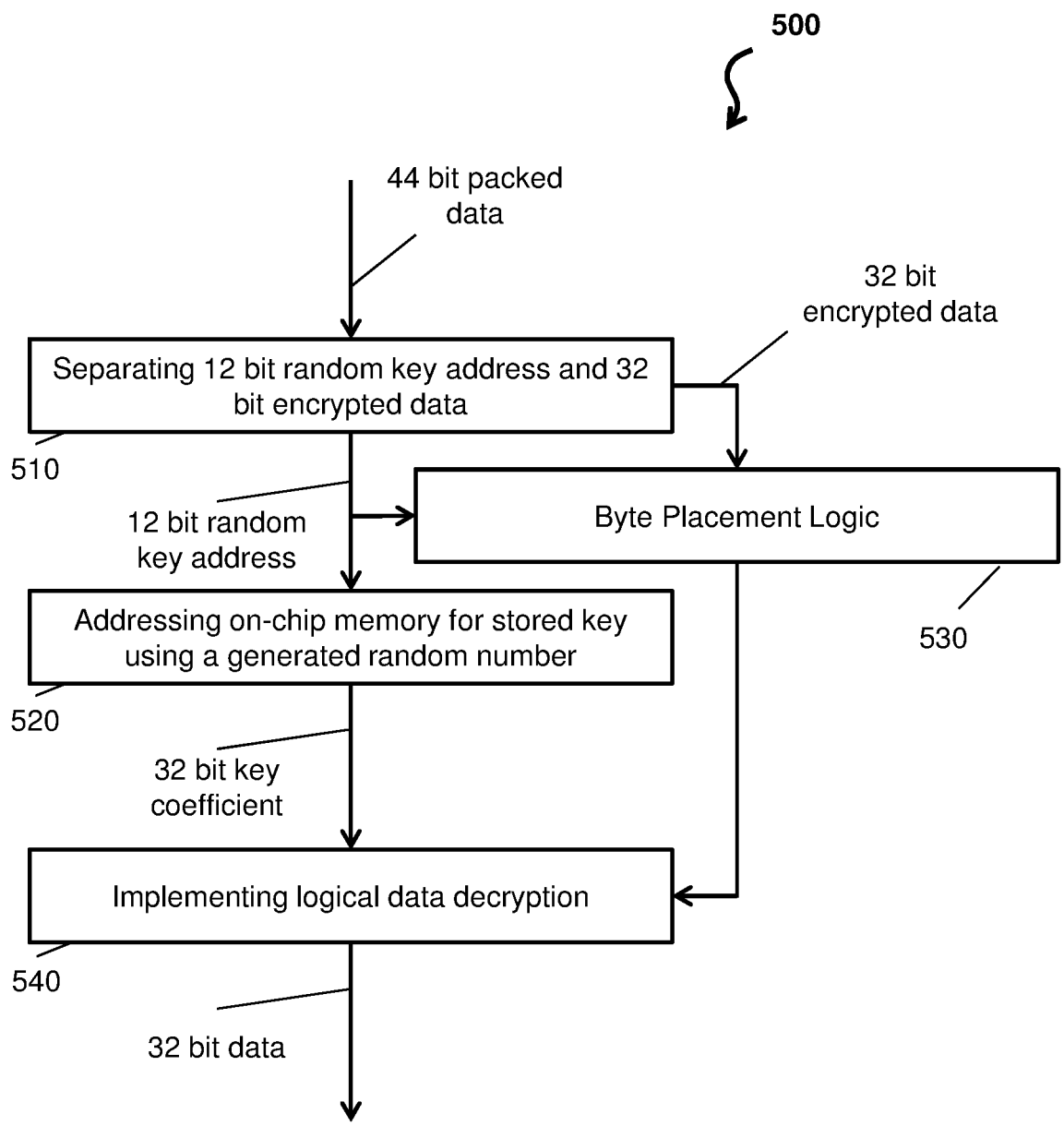
FIG. 5 depicts a process flow in accordance with one or more embodiments.

FIG. 4 depicts a decryption block schematic 400 for received encrypted data also denoted 280 in accordance with one or more embodiments. The decryption block schematic 400 is an example of the baseband hardware block 121 of FIG. 1, where actual data is received and provided to the components of the node 110 and encrypted data is received and provided to the interface 125. Hardware components of the decryption block schematic 400 that are the same as the encryption block schematic 200 are reused. As shown, the decryption block schematic 400 comprises the ROM 124, FIG. 5 depicts a process flow 500 in accordance with one or more embodiments. The process flow 500 is an example of how the decryption block schematic 400 decrypts data for transmission. Note that the decryption of process flow 500 is at the hardware/chip level and is a pseudo-inversion of process flow 300 of FIG. 3.

The process flow 500 begins at block 510, where the decryption block schematic 400 of FIG. 4 receives and separates a 44 bit packed data into a 12 bit random key address and a 32 bit encrypted data. At block 520, the 12 bit random key address is used to address 4 k memory location of the ROM 124 to select the pre-stored 32 bit key coefficient (KDxx). In addition, as depicted at block 530 the process flow 500 also includes directing the 12 bit random key address that was separated at process step 510 to the byte placement logic 250 along with the 32 bit jumbled encrypted data (e.g., Z, Y, X, W in FIG. 4). Similar to that described above, the 12 bit random key address and the 32 bit jumbled encrypted data Z, Y, X, and W are then passed to a byte placement logic function (also denoted 250) (denoted "BYTE PLACEMENT LOGIC" in this figure for simplicity). In an embodiment for simplicity the byte displacement logic 250 employs and operates with lower 5 bits of the 12 bit random key address. This byte placement logic 250 unjumbles the byte positions of the four encrypted data bytes Z, Y, X, and W respectively to formulate unjumbled encrypted data bytes depicted as "A", "B", "C", and "D". Similar to the description above, in this instance the byte placement logic 250 is effectively is a Byte cross point switch that unscrambles or unjumbles the jumbled encrypted data bytes Z, Y, X, and W based on the random key address. As a result, the mentioned byte placement logic 250 will change the byte locations from the received data packet in a defined manner based on the random key address. The output of the byte placement logic 250 is the unjumbled encrypted data shown as "A", "B", "C" and "D" as described earlier. The unscrambling based on the random key address is also evident from Table 1.

At block 540, the 32 bit encrypted data (EDxx, the actual data received data under decryption) is logically decrypted (XOR and XNOR operations 241, 243, 245, and 247) using key coefficients to make decrypted data (RXDxx, the 32 bit decrypted data 480). As shown in FIG. 4, a cross logical decryption operation is performed. That is, KD8-KD1 low significant byte of the key coefficient stored in the ROM 124 perform an XOR operation (e.g., encryption-decryption logic 241) with most significant byte of the 32 bit encrypted data (e.g., ED32-ED25) to generate most significant byte of decrypted data RXD32-RXD25 (481). Further, KD16-KD9 is used for ED24-ED17 to do a XNOR operation (e.g., encryption-decryption logic 243) and generate RXD24-RXD17 (483); KD24-KD17 is used for ED16-ED9 to do a XOR operation (e.g., encryption-decryption logic 245), which generates RXD16-RXD9 (485); and KD32-KD25 is used for ED8-ED1 to do a XNOR operation (e.g., encryption-decryption logic 247), which generates RXD8-RXD1 (487).

In accordance with one or more embodiments, the encryption and decryption system can operate on any word and/or memory length and the examples herein with respect to 12 bit, 32 bit, and 44 bit are not intended to be limiting.

Aspects of the embodiments described herein are made with reference to flowchart illustrations and/or block diagrams of methods, apparatus (systems), and computer program products. It will be understood that each block may be implemented by hardware, firmware, and/or computer machine readable program instructions stored on a computer readable medium.

These computer machine readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transceiver baseband hardware comprising:
    a baseband hardware block comprising an encryption-decryption block configured to encrypt and jumble intended transmission data or unjumble and decrypt received encrypted data, the encryption and the decryption based on key coefficients generated based on a random key address, the encryption and the decryption implemented via a cross logical operation of the encryption-decryption block,
    wherein the cross logical operation comprises lower significant bytes of the key coefficients operating on most significant bytes of the intended transmission data or the encrypted data, and
    wherein the jumble and the unjumble are implemented by a byte displacement/placement block based at least in part on the random key address.

2. The transceiver baseband hardware of claim 1, wherein the baseband hardware block comprises an on-chip memory storing the key coefficients.

3. The transceiver baseband hardware of claim 1, wherein the baseband hardware block comprises a random number generator that generates the random key address for selecting one of the key coefficients stored in an on-chip memory.

4. The transceiver baseband hardware of claim 1, wherein the encryption-decryption block comprises encryption-decryption logic and the cross logical operation as a hardware implementation.

5. The transceiver baseband hardware of claim 1, wherein the byte displacement/placement block includes byte displacement/placement logic as a hardware implementation.

6. The transceiver baseband hardware of claim 1, wherein the byte displacement/placement block implements a look-up table responsive to the random key address, wherein the look-up table is variable for a selected aircraft.

7. The transceiver baseband hardware of claim 1, wherein at least one of the random key address and the key coefficients are variable for a selected aircraft.

8. The transceiver baseband hardware of claim 1, wherein a field programmable gate array (FPGA) or a microcontroller based system comprises the transceiver baseband hardware,
    wherein the FPGA or the microcontroller based system provides the intended transmission data to the baseband hardware block for encryption.

9. The transceiver baseband hardware of claim 1, wherein the transceiver baseband hardware comprises:
    an antenna and an interface that, in combination, transmit and receive the encrypted data to and from external transceivers.

10. The transceiver baseband hardware of claim 9, wherein the interface comprises a radio frequency transceiver that transmits or receives the encrypted data at 4.2-4.4 GHz via the antenna.

11. An encryption/decryption method implemented by a transceiver baseband hardware, the encryption/decryption method comprising:
    utilizing a random key address to select a key coefficient stored on an on-chip memory of the transceiver baseband hardware;
    applying a cross logical operation utilizing the key coefficient to encrypt intended transmission data or decrypt encrypted data via an encryption-decryption block of the transceiver baseband hardware;
    employing the random key address to jumble the encrypted transmission data or unjumble received jumbled encrypted data via a byte displacement/placement block of the transceiver baseband hardware;
    wherein the cross logical operation comprises lower significant bytes of the key coefficient operating on most significant bytes of the intended transmission data or the encrypted data.

12. The encryption/decryption method of claim 11, further including a random number generator generating the random key address for selecting the key coefficient and controlling the byte displacement/placement block.

13. The encryption/decryption method of claim 11, wherein the cross logical operation is a hardware implementation of the encryption-decryption block.

14. The encryption/decryption method of claim 11, wherein the jumble the encrypted transmission data or unjumble received jumbled encrypted data operation is a hardware implementation of the byte displacement/placement block in the transceiver baseband hardware.

15. The encryption/decryption method of claim 11, wherein a field programmable gate array (FPGA) or a microcontroller based system comprises the transceiver baseband hardware, wherein the FPGA or the microcontroller based system provides the intended transmission data to the transceiver baseband hardware for encryption.

16. The encryption/decryption method of claim 11, further transmitting and receiving the encrypted data to and from external transceivers interfaced to an antenna.

17. The encryption/decryption method of claim 16, wherein the transmitting or receiving the encrypted data is at 4.2-4.4 GHz.

18. The encryption/decryption method of claim 11, further including implementing with the byte displacement/placement block, a look-up table responsive to the random key address, wherein the look-up table is variable for a selected aircraft.

19. The encryption/decryption method of claim 11, wherein at least one of the random key address and key coefficients are variable for a selected aircraft.

* * * * *